Oct. 22, 1935.          W. G. CADY          2,017,894
FREQUENCY STABILIZATION OF A GENERATOR OF ALTERNATING CURRENT
Filed Nov. 12, 1930        3 Sheets-Sheet 1
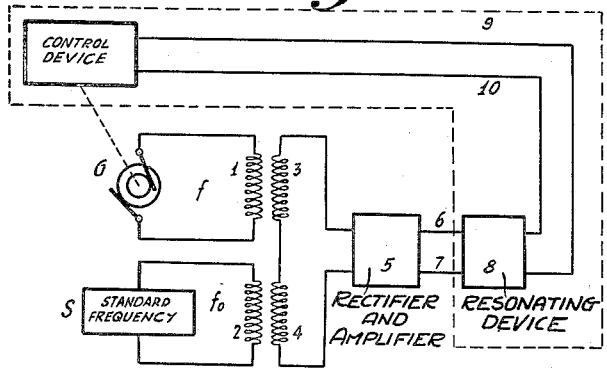
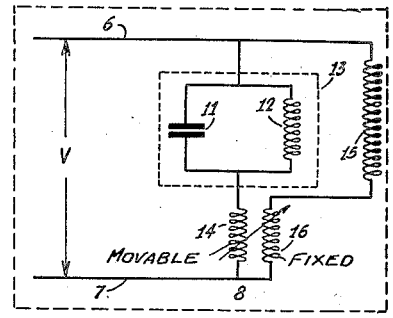
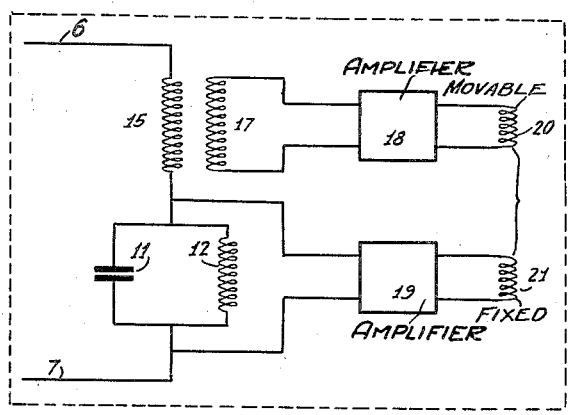
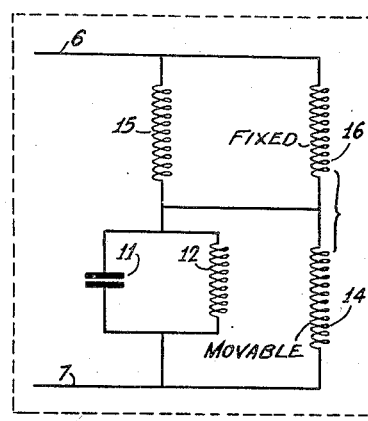
INVENTOR
W.G. CADY
BY
ATTORNEY Oct. 22, 1935.  W. G. CADY  2,017,894
FREQUENCY STABILIZATION OF A GENERATOR OF ALTERNATING CURRENT
Filed Nov. 12, 1930  3 Sheets-Sheet 2
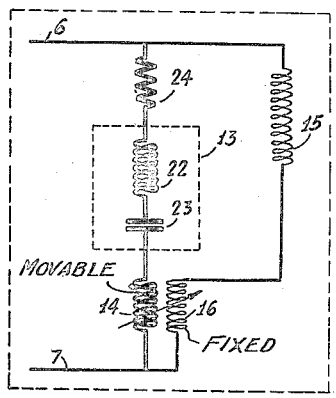
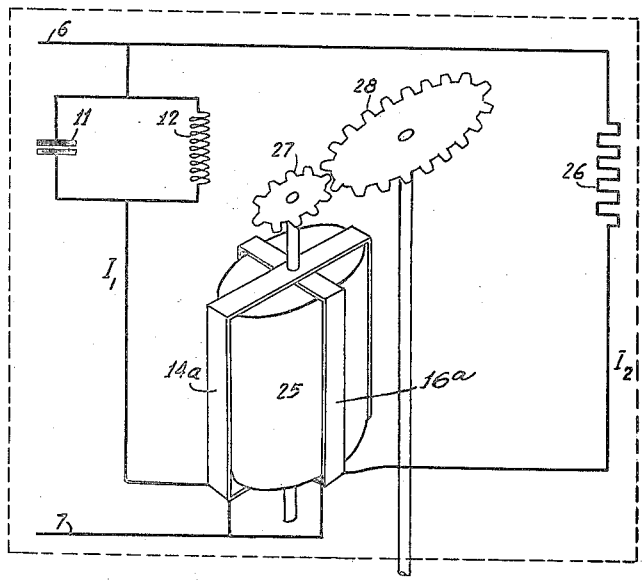
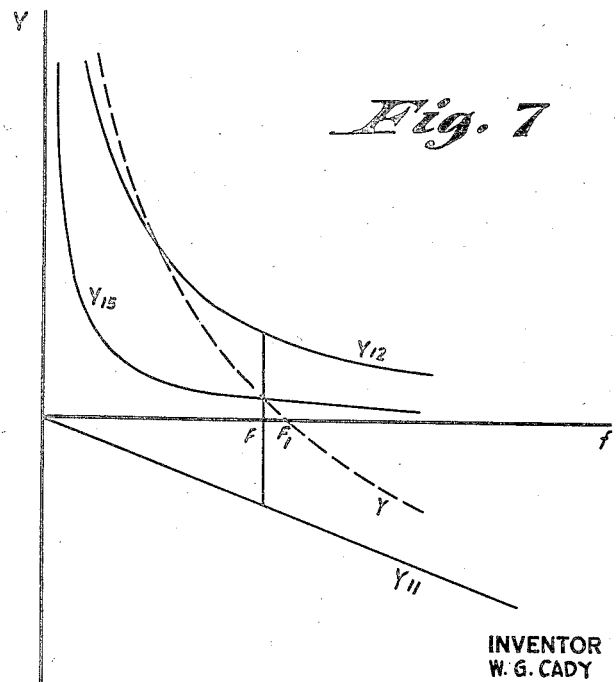
INVENTOR
W. G. CADY
BY
ATTORNEY Oct. 22, 1935.   W. G. CADY   2,017,894
FREQUENCY STABILIZATION OF A GENERATOR OF ALTERNATING CURRENT
Filed Nov. 12, 1930    3 Sheets-Sheet 3
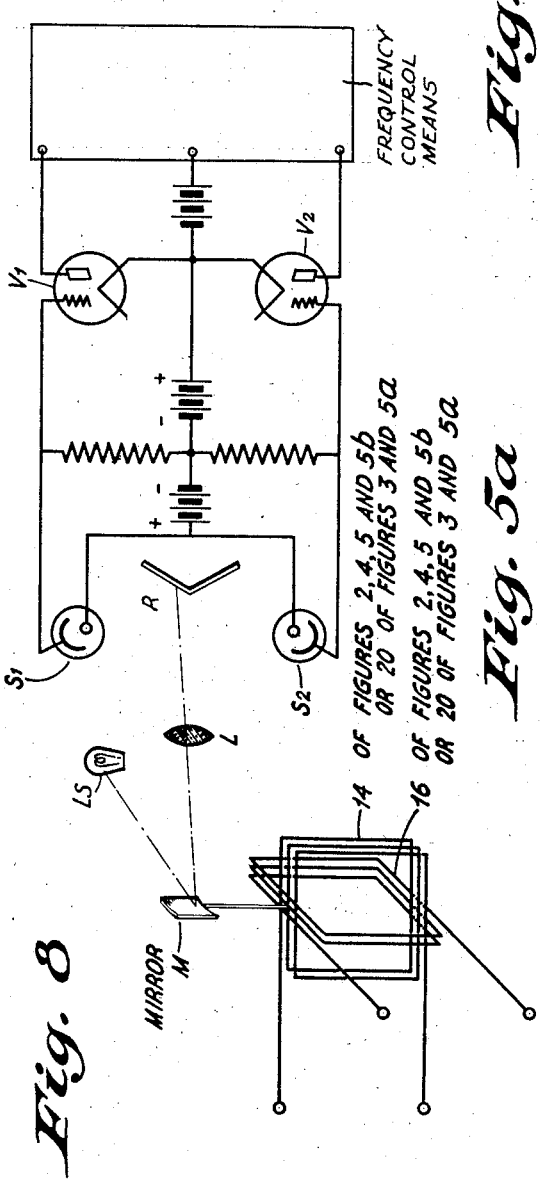
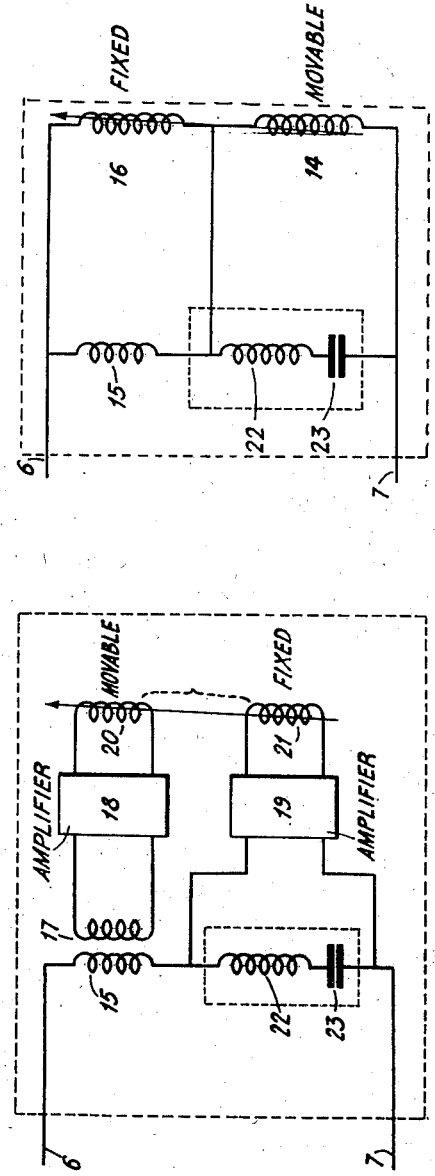
INVENTOR-
W. G. CADY
BY
ATTORNEY- Patented Oct. 22, 1935

2,017,894

UNITED STATES PATENT OFFICE 2,017,894

FREQUENCY STABILIZATION OF A GENERATOR OF ALTERNATING CURRENT

Walter G. Cady, Middletown, Conn., assignor to Radio Corporation of America, a corporation of Delaware Application November 12, 1930, Serial No. 495,122

3 Claims. (Cl. 250—36)

This invention relates to a method whereby the frequency $f$ of any alternating current generator, more particularly a generator of radio frequency, can be stabilized by means of a low-power, constant-frequency device, for example a piezo-electric oscillator of frequency $f_0$.

Briefly the invention is carried out as follows:

The current of frequency $f$, or some harmonic thereof, is caused to beat against the constant frequency current of frequency $f_0$, or against one of its harmonics, so as to produce a beat-frequency current of convenient low frequency F, say 1000 cycles per second. This current of frequency F is then caused to act on a resonating device which is sharply tuned to a frequency $F_0$, such that when the power generator has its normal frequency $f$, the beat frequency F will be equal to $F_0$. If $f$ departs slightly from its normal frequency one way or the other, F will be correspondingly varied, which will cause the low frequency resonating device to operate, as described below, in such a manner as to cause the frequency $f$ to be restored to its normal value.

The manner in which the present invention is carried out will be more fully understood from the following description taken in connection with the accompanying drawings, in which:

Fig. 1 is a diagrammatic view of a system embodying the present invention;

Fig. 2 is a detail view of a resonating device used in this invention;

Figs. 3, 4, 5, 5a, 5b and 6 are diagrammatic representations of modifications of the device shown in Fig. 2;

Fig. 7 shows certain curves which are used in connection with a theoretical study of this invention; while, Figure 8 illustrates an application of the novel frequency comparing circuits of the prior figures to a control means connected with a generator, the frequency of which is to be controlled.

Referring in detail to the drawings, the general arrangement of apparatus is shown in Fig. 1. Coil 1 carries a current taken from the power generator G at frequency $f$, while coil 2 is in the circuit of the standard frequency oscillator S of frequency $f_0$. Coupled to 1 and 2 are coils 3 and 4, which constitute the input to the rectifier and amplifier 5. Instead of being in series, these coils may also be disposed in other ways well known to the art, for example, they may be combined into a single coil or each may constitue a separate input circuit, or they may be in a detector circuit intermediate between 1, 2 and the amplifier 5. The output from 5, which is of the beat frequency $F=f-f_0$, flows through the resonating device 8. The output from 8 flows through wires 9 and 10 to the control device which is connected to the generator in order to control its frequency as described below.

The resonating device 8 and control means enclosed within the broken lines may be replaced by the elements illustrated in Figs. 2, 3, 4, 5, 5a, 5b and 6.

Fig. 2 shows details of the resonating device. This consists of a condenser 11 and low resistance coil 12 connected preferably in parallel and mounted inside of a screening box 13. In series with this combination is a small coil of low impedance 14. A choke coil 15 of low resistance which presents a high reactance to the frequency F is connected as shown. In series with coil 15 is a small coil of low impedance 16. Coils 14 and 16 are so mounted as to constitute an arrangement similar to an electrodynamometer. For example, coil 16 can be a fixed coil mounted in a vertical plane, while coil 14 is movable, being suspended from a fine wire inside of coil 16, its plane being at right angles to the plane of 16. The operation is as follows:

As long as the frequency $f$ of the power generator G is at its normal value, the beat frequency F is equal to the resonant frequency $F_0$ to which 11 and 12 are carefully adjusted once for all. Under these conditions the current through coil 14 has its minimum value and is nearly in phase with the voltage V across the wires 6 and 7. On the other hand, the current through coil 16 lags behind V by approximately 90°. There is, therefore, no appreciable torque acting upon coil 14. If, however, the frequency $f$ departs by a small amount from its normal value, the current in coil 14 will not only increase but its phase will shift one way or the other with respect to the phase of the current in 16. Coil 14 will, therefore, rotate one way or the other, depending upon whether $f$ becomes greater or less than its normal value. If, for example, $f$ decreases, the reactance of the resonating device 11, 12, becomes inductive, which causes the current in 14 to lag slightly. On the other hand, if $f$ increases, the reactance of the resonating device becomes capacitive, and the current in coil 14 will lead the voltage V.

In order that changes in the position of the coil 14 may cause the frequency $f$ to be brought back to its normal value, a mirror is attached to coil 14 so as to reflect a beam of light from a suitable source upon a photo-electric device such as I have described in detail in my patent application entitled, "Photo-electric device for the automatic control of apparatus," Serial No. 477,329, filed August 23, 1930. The variations in output current from the photo-electric device may, by means of a small motor, solenoid, or otherwise, be caused to control the frequency of the generator, for example, by varying the capacity of a condenser in its oscillating circuit.

This application has been illustrated in Fig. 8 in which the movable winding 14 or 20 drives a mirror M. The mirror M cooperates with lens L and a light source LS to throw a ray of light on reflector R, from which the ray is reflected to either cell $S_1$ or $S_2$. Under the action of the ray of light the cell $S_1$ or $S_2$ applies a differential potential to the control electrodes of tubes $V_1$, $V_2$. The anodes of the tubes are connected as shown to a frequency control means which in turn may be connected with the generator the frequency of which is to be controlled.

The coil 15, Fig. 2, or its equivalent in the modifications of this device described below, should not be of too great impedance, since it is important to have the current in 16 sufficiently strong to produce an appreciable torque on the coil 14 for very slight departures of the frequency F from its normal value.

Fig. 3 shows a modification of Fig. 2, in which coil 15 is in series with the resonating device 11, 12, instead of being in parallel therewith. In this case the current in 15 will, of course, be in phase at all frequencies with the resultant current through 11, 12, but the phase of the potential difference across 11, 12, will, as the frequency varies, change with respect to that across 15. We can, therefore, without appreciably disturbing these phase relations, couple 15 to the input coil 17 of an amplifier 18, and connect the terminals of 11, 12, directly to the input of amplifier 19. Or, other modes of coupling might obviously be employed. The output currents from 18 and 19 are led through two coils 20 and 21, respectively, which fulfill the same functions as coils 14, 16, in Fig. 2.

It is also possible in Fig. 2 to connect coils 16 and 14 in parallel with 15 and with 11, 12, respectively, as shown in Fig. 4. They then have to be of very high self-inductance in order to avoid undesirable reactions upon 15 and 11, 12.

As an example of the sharpness of control attainable by this device, consider the following numerical example. Let us assume that coil 12, Fig. 2, has a self-inductance of approximately 3 m. h., and that condenser 11 has a capacity of 0.1 m. f. The beat frequency F will in this case be approximately 900 cycles per second. If the resistance of coil 12 is 10 ohms, the phase difference between the currents in 14 and 16 will change by approximately 30° for a change in frequency of 1.5 cycles per second in either direction, or by approximately 80° for a frequency change of 16 cycles per second in either direction. The current increases but very little for a frequency change of 1.5 cycles per second, but for a frequency change of 15 cycles per second, the increase in current is over six-fold.

As a resonating device, it is possible to use a coil and condenser in series instead of in parallel as shown in Figs. 2 and 3. One manner in which such a series resonance device can be used is shown in Fig. 5. In this figure, 22, 23, are the coil and condenser, respectively, of the series resonance device, while coils 14, 15 and 16 are as in Fig. 2. Since in series resonance the impedance of the resonating device is a minimum at the resonance frequency, it may be desirable to insert a resistance 24 in series with 22, 23, in order to prevent the impedance of the branch containing 22, 23, from being excessively small in comparison with that of coil 15.

Or, alternatively, the series resonating device 22, 23, may be connected in series with coil 15 just as the parallel resonating device 11, 12, is connected in series with 15 in Figs. 3 and 4 as illustrated in Figs. 5a and 5b. Otherwise the circuits will be as in Figs. 3 and 4.

The change in phase of the current in 22, 23, relative to that in 15, is utilized in series resonance exactly as in parallel resonance.

In the case of series resonance, the phase changes in the neighborhood of resonance will, for the same circuit elements in the resonating device, be the same as for parallel resonance. The difference lies chiefly in the fact that with parallel resonance the current through the resonating device is very nearly a minimum at resonance, while with the coil and condenser in series it is a maximum (provided that the potential difference across the resonating device remains constant). Consequently, the load on the amplifier 5, Fig. 1, will be a maximum at normal frequency when series resonance is used, which will cause the voltage V across 6, 7 to be a minimum. As the frequency departs from normal, V will rise and this will make the strength of the control exercised by the resonating device 8 greater the wider the departure from resonance. This of itself is, of course, an advantage, but it is partly offset by the fact that the response of the device 8 to small changes in frequency is more dependent upon changes in relative phase between coils 14 and 16 than on changes in current.

If sufficient power at frequency F is supplied by the wires 6, 7, we may dispense with the photoelectric device, described in connection with Figure 2 and illustrated in Figure 8, and control the frequency directly by means of a small two-phase motor. Fig. 6 shows one mode of connection. This figure is similar to Fig. 2 in all respects except that we now have a high non-inductive resistance 26 in place of the self-inductance 15, and that the coils 14 and 16 of Fig. 2 are replaced by the two stator coils 14a and 16a of the two-phase motor, the rotor being 25.

As long as the generator frequency remains normal, the current $I_1$ in coil 14a, is approximately in phase with current $I_2$ in coil 16a, (neglecting the small inductance of coil 16a, for which, if desired, a compensation may be provided). Hence there is then no torque acting upon rotor 25, which remains at rest. If now the generated frequency f becomes too low, the current $I_1$ will lag by a certain amount. The current $I_2$ through 16a is at all frequencies substantially in phase with V. The resulting phase difference between $I_1$ and $I_2$, together with the fact that the greater the departure of f, and hence of F, from its normal value, the greater will be the current $I_1$, causes the rotor to turn in a particular direction, say clockwise. By means of the pinion 27 on the rotor shaft, or of a worm gear, the large gear 28 will turn slowly, which may be caused to turn a small variable condenser in such a direction as to reduce the frequency f to its normal value, at which point the rotor will come to rest. Electromagnetic damping may be provided for the rotor, of the type, for example, used in watt-hour meters.

An increase in f will be followed by a rotation of 25 in the opposite direction, causing the variable condenser to increase $f$ back to its normal value. The same two-phase motor device may be applied in conjunction with other modes of connection of the resonating device as described above. For example, in Fig. 3 the stator coils will be 20, 21; in Figs. 4 and 5, coils 14 and 16. The essential thing is to have a high resistance in place of the self-inductance 15 of Fig. 2, or its counter-part in the modifications as described above.

In Fig. 3 I have shown how the currents after being amplified by amplifier 5 of Fig. 1 and passed through the resonating device 8 may be further amplified before being applied to the control of frequency. This principle may also be applied to the other cases herein mentioned, and is especially desirable when the two-phase motor device is to be employed. For example, in Fig. 2 the coils 14 and 16 may be the primary coils of transformers connected to amplifier input circuits. Similarly in Figs. 4 and 5 coils 14 and 16 may be made to serve in this manner.

In some of the modes of connection described above there is the possibility that, in addition to the critical frequency for which the resonating device is adjusted, there may be one or more resonance frequencies to which the entire output system will respond. Thus, for example, in Fig. 2, it is clear that while there is no sudden change in the impedance of the entire network at the resonance frequency of 11, 12, still there is a critical frequency at which the total network impedance will be a maximum. This point is illustrated by Fig. 7 in which the three curves $Y_{11}$, $Y_{12}$, and $Y_{15}$ represent the variations with frequency $f$ of the admittances of the three branches 11, 12 and 15 of Fig. 2 (the impedances of 14 and 16 may be as a first approximation ignored). In this figure resistances are neglected, so that the admittances are all susceptances. At the point marked F the admittances of 11 and 12 are equal and opposite, showing that this is the parallel resonance frequency for 11, 12. The point at which the total network admittance is zero is $F_1$, where the resultant admittance curve Y (broken line) cuts the horizontal axis. So far as parallel resonance is concerned, no harm results from the fact of a resonance frequency due in part to coil 15, for the phase relation between 11, 12 on the one hand, and 15 on the other, which is the most important consideration, is unaffected by the existence of a resultant frequency F, and there is no objection to having the total output impedance a maximum at this frequency, so long as the voltage V (Fig. 2) remains reasonably constant with varying small loads.

By similar reasoning it is easy to show in the case of Fig. 3 (considering only 11, 12 and 15, and neglecting resistances) that the total impedance is still a maximum at the resonance frequency of 11, 12, but that in addition there is a somewhat higher frequency at which series resonance occurs between the inductance of 15 and the capacitance of 11, 12. If the increase in output current at this frequency is objectionable, a suitable resistance may be inserted in series with 15.

Similarly, with the apparatus connected as in Fig. 5, there will be parallel resonance between the inductance of 15 and the capacitance of 22, 23 (neglecting the effects of 14 and 16, which are small) at a frequency somewhat lower than the series resonance frequency of 22, 23. No objectionable effects are to be anticipated from this.

Also, if the series resonance device 22, 23 is in series with 15, as described above, there will be a frequency less than the series resonance frequency of 22, 23, at which series resonance will occur between the combined inductance of 15 and 22 and the capacitance of 23. This will make the total impedance a minimum, and as in the cases described above the resulting increase in current at this frequency may be held in check by a suitable series resistance if desired.

It should be understood that in all the cases described above the essential quantity is the phase relation between the resonating device and the auxiliary self-inductance 15, or auxiliary resistance 26, Fig. 6, associated therewith.

Whenever the above mentioned photo-electric device is employed to regulate the energy supply that restores the frequency to its normal value after any disturbance, it is important that the restoring mechanism fulfill as far as possible the following conditions: (1) It should approximate closely the "unconditional" type of control described in my application entitled "Photo-electric device for automatic control of apparatus"; and (2) It should operate promptly with as little lag or inertia as possible. The rotational inertia of coil 14 (Fig. 2), for example, can be made very small, while the electrical inertia in the photo-electric cell and associated amplifier is inappreciable, hence whatever lag there is will reside mostly in the final frequency-controlling mechanism.

As an example of the approximate fulfillment of above conditions, (1) and (2), let us suppose that the control mechanism is to be a variable condenser which is to be varied by some electromagnetic device controlled by the amplifier output, such as a solenoid and plunger, or a small motor. Then the friction of all moving parts should, by means of carefully constructed bearings, be reduced to a minimum, and it may also be desirable to compensate for the electrostatic attraction between the fixed and movable members of the condensers by some such device as a light metallic spring. In this way the amount by which coil 14 (Fig. 2), for example, will have to be deflected in order to cause the frequency control to operate, will be reduced to a minimum.

The device described above allows great latitude in the choice of frequencies. Instead of using beats between the fundamental frequencies, $f$ and $f_0$, to produce the frequency F, some harmonic of $f$ or of $f_0$, or both, may be used. Thus the device may still be employed even in cases where $f$ is several times greater or less than $f_0$. By proper choice of harmonics, the power generator may be stabilized at any one of several frequencies by means of the standard frequency $f_0$, the resonating device having the same frequency F in each case. By varying the resonant frequency of the resonating device 11, 12, or by having two or more such devices available, a still greater number of frequencies may be stabilized by the standard frequency $f_0$.

As "standard frequency", any source of high frequency may be employed, including the carrier frequency received from a distant station and amplified to produce a beat frequency F of sufficient volume to control the local oscillations of any generator that has a harmonic of the right value to produce the beat frequency F with the incoming signals.

Having thus described my invention, I claim:

1. A frequency control system comprising, a first generator of electrical oscillations whose frequency is to be controlled, a second generator of electrical oscillations of a known frequency, said frequencies differing by a beat frequency, a circuit connected to both of said generators, rectifying means in said circuit to produce therein a beat frequency equal to the difference frequency, a control device for determining the frequency generated by said first generator, a circuit tuned to resonance at said beat frequency, a connection between said resonating circuit and said combining circuit, an impedance connected with said resonating circuit, said resonating circuit and said impedance both being subject to potentials produced by the beat frequency in said combining circuit whereby changes in said beat frequency produce changes in the phase relationship between the currents or potentials in said impedance and in said resonating circuit, and means actuated by said changes in phase relationship between the currents or potentials in said resonating circuit and in said impedance for actuating said control device to control the frequency of the oscillations produced by said second generator.

2. A frequency control system comprising, a first generator of electrical oscillations whose frequency is to be controlled, a second generator of electrical oscillations of a known frequency, said frequencies differing by a beat frequency, a circuit connected to both of said generators, rectifying means in said circuit to produce therein a beat frequency equal to the difference frequency, a series circuit tuned to series resonance at said beat frequency, a connection between said series resonating circuit and said combining circuit, an impedance connected with said series resonating circuit, said resonating circuit and said impedance both being subject to the potential produced by the beat frequency in said combining circuit whereby changes in the phase relationship between the currents or potentials in said impedance and in said series resonating circuit are produced by changes in said beat frequency, an inductance connected with said series resonating circuit, an inductance connected to said impedance, said inductances being coupled together, one of said inductances being movable, frequency control means connected with said generator, the frequency of which is to be controlled, and a connection between said movable inductance and said control means for controlling the frequency of the oscillations produced by said second generator.

3. A frequency control system comprising, a first generator of electrical oscillations whose frequency is to be controlled, frequency determining means connected therewith, a second generator of electrical oscillations of a known frequency, said frequencies differing by a beat frequency, a circuit connected to both of said generators, rectifying means in said circuit to produce therein a beat frequency equal to the difference frequency, a circuit tuned to parallel resonance at said beat frequency, a connection between said parallel resonating circuit and said combining circuit, an impedance connected with said parallel resonating circuit, said resonating circuit and said impedance both being subject to potentials produced by the beat frequency in said combining circuit whereby changes in the phase relationship between the currents or potentials in said impedance and in said resonating circuit are produced by changes in said beat frequency, an inductance coupled to said impedance, an inductance coupled to said parallel resonating circuit, said inductances being coupled together, one of said inductances being movable, and a connection between said movable inductance and the frequency determining means for controlling the frequency of the oscillations produced by said second generator.

WALTER G. CADY.